March 3, 1964  R. FAGEL  3,123,730
TOTALLY ENCLOSED ELECTRIC MOTOR
Filed Dec. 1, 1960  2 Sheets-Sheet 1

INVENTOR
Roger FAGEL
BY
ATTORNEYS

March 3, 1964 R. FAGEL 3,123,730
TOTALLY ENCLOSED ELECTRIC MOTOR
Filed Dec. 1, 1960 2 Sheets-Sheet 2

INVENTOR
Roger FAGEL
BY
ATTORNEYS

United States Patent Office 3,123,730
Patented Mar. 3, 1964

3,123,730
TOTALLY ENCLOSED ELECTRIC MOTOR
Roger Fagel, Marcinelle, Belgium, assignor to Ateliers de Constructions Electriques de Charleroi, Brussels, Belgium
Filed Dec. 1, 1960, Ser. No. 73,126
5 Claims. (Cl. 310—54)

The present invention relates to an improved totally enclosed electric motor, proof against fire and flame.

Electric motors are already known, comprising a hermetically closed space, inside which air is circulated in order to provide insulation and cooling at the same time. Electric motors are also known, having hollow conductors in which a cooling liquid circulates.

Furthermore, in a quite different technical field, electric motors have already been used for immersed oil pumps wherein because of their application, the rotor and in some cases also the stator were bathed in oil, but in these motors the oil was an accessory and had no direct relation to the motor. Although the oil could fulfill useful functions, it was not present in the motor to facilitate its operation, but on the contrary the motor was arranged to pump the oil in an open circuit to delivery.

The present invention has no connection with these known motors. The improved motor according to the invention has both the stator and the rotor immersed in an insulating liquid, all the solid insulating material used being resistant to said insulating liquid, and is characterised in that a pump circulates the insulating liquid in closed circuit through the clearance gap between the rotor and stator, and also through conduits formed in the conductors and in the end plates and laminations of the stator and rotor and then through channels extending longitudinally of the motor, the body of the latter being cooled by other means. The said insulating liquid is preferably oil. Although a motor according to this invention is subjected to a significant braking due to the presence of oil, it is surprising to observe that it possesses an output greatly superior to the output of an air-cooled motor. This unexpected effect can be explained by the excellent cooling obtained by reason of the invention, which cooling largely counter-balances the losses due to the viscosity of the oil and therefore permits better utilisation of the space, involving a reduction in the total losses in comparison with conventional motors which are not of the same geometric dimensions but are of the same power.

The invention is explained hereinafter by reference to a non-limitative example of embodiment represented in the accompanying diagrammatic drawings, in which.

Figure 1:
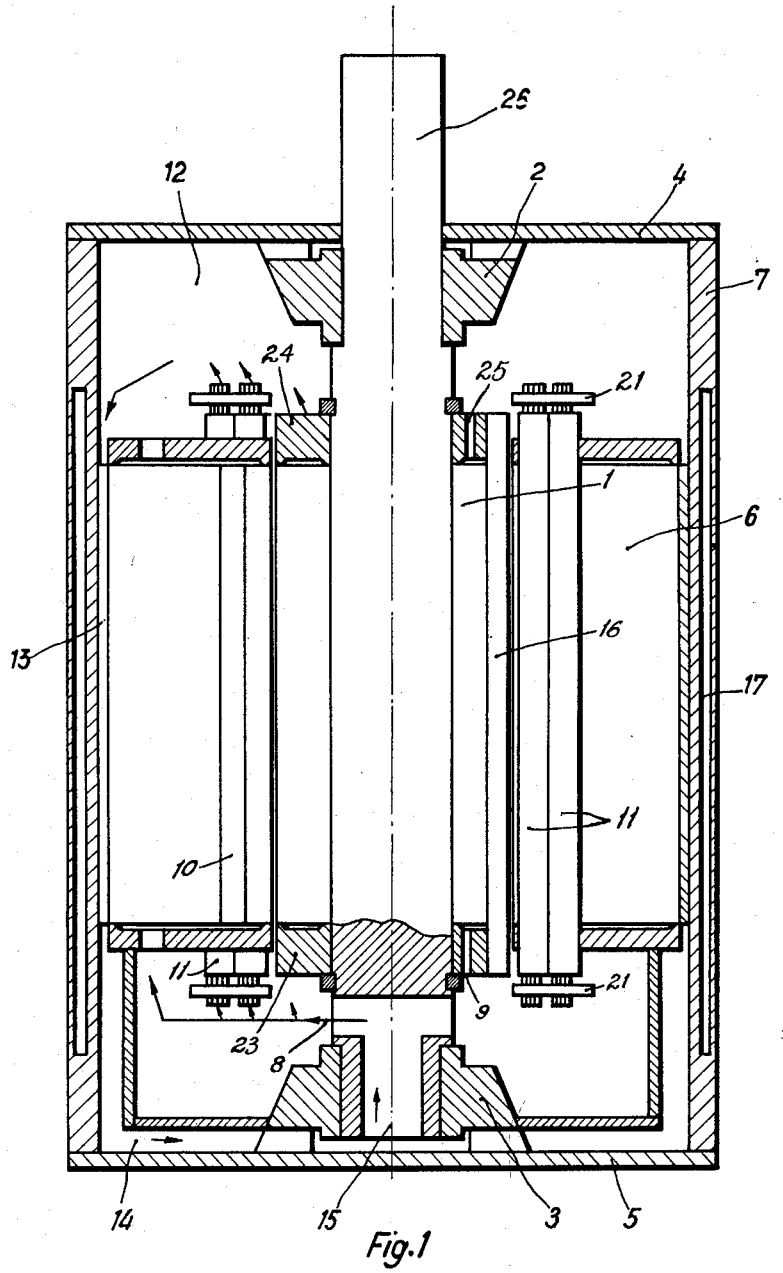
FIG. 1 is a longitudinal section of the improved motor.

In FIG. 1, the rotor 1 is shown with its shaft 26 mounted in bearings 2 and 3 upon end-plates 4 and 5 for rotation on the axis of the stator 6, which is held in a body 7 closed by the end-plates 4 and 5. The interior of the body 7 is filled with oil which circulates from the delivery 8 of a centrifugal pump at one end of the shaft 26, through the clearance gap between the rotor 1 and stator 6, through cooling channels 9 in the rotor, through cooling channels 10 in the stator and between bundles of hollow conductors 11 in the stator, so as to reach the end space 12, whence it returns through channels 13 between the stator 6 and body 7 into a space 14 at the other end, from which it is drawn into the intake 15 of the pump. This pump, arranged in the end of the motor shaft opposite the driving end, consists quite simply of an axial hole serving as the intake 15 and several radial holes for the delivery of the oil drawn in at 15. The body 7 comprises a cooling jacket 17, in which there can circulate any cooling fluid, for example air, water, petroleum, oil or other suitable fluid available.

Figure 2:
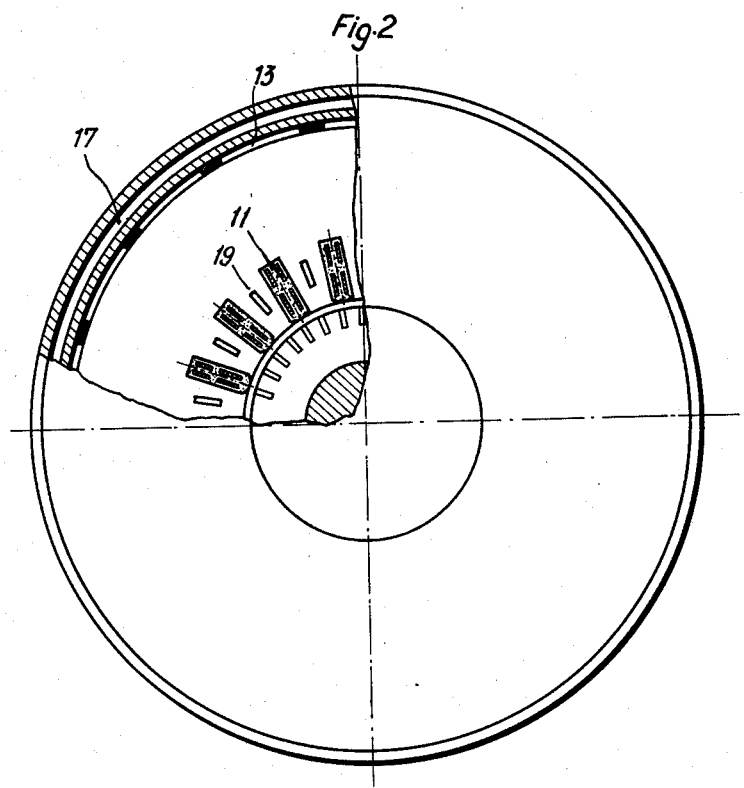
FIG. 2 is a cross-section.

In order to obtain good efficiency from such a motor, it is essential to counter-balance the supplementary losses caused by the high viscosity of the oil as compared with that of air, by other measures taking advantage of the specific properties of the oil. Accordingly, cooling channels are led directly through the parts of the motor wherein heat is evolved, that is to say, in the present case, the conductors and the iron parts in which the magnetic induction is at a maximum. Thus, there are provided in the stator bundles of hollow conductors 11 disposed in slots and open at both ends of the stator, and slots 19 (as seen in FIG. 2) formed in the teeth between the conductor slots, in such a manner that the minimum width of iron between a pair of conductor slots is not altered by the intermediate slots. When the laminations are stacked together, these slots 19 form the cooling channels 10.

The hollow conductors projecting at each end of the bundles 11 are connected with one another, not by hollow connections, but by solid bars 21 soldered laterally to the exposed hollow conductors.

Cooling of the rotor is more difficult to effect than in the stator, and therefore a different arrangement from that described above has been provided.

Figure 3:
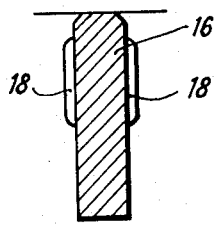
FIGS. 3 and 4 represent two variants of a rotor slot.
Figure 4:
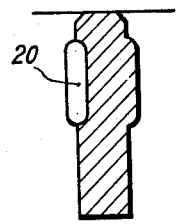

The rotor conductors 16 are solid copper bars; they are cooled by lateral oil channels delimited on one side by the surfaces of the conductors 16, which may be covered by insulation, and on the other side by the iron of the rotor laminations. According to the variant represented in FIG. 3, two cooling channels 18 have been provided on opposite sides of the conductor 16. According to the variant represented in FIG. 4, a single oil channel 20 is provided, disposed only on one side of the conductive bar 22, but having the equivalent section of the two channels 18. In this manner, the liquid encounters a frictional resistance only half that in the first case, where the friction surface is double.

The channels 18 or 20 commence in one end-plate 23 of the rotor, which comprises the channel openings 9, and terminate at the other end in the rotor end-plate 24, which comprises similar openings 25. The two end-plates 23 and 24 are keyed or otherwise fixed on the shaft 26, and they extend as far as the periphery of the rotor, as seen in FIG. 1.

Insulating oil suitable for use in such motors will preferably have a relatively low viscosity, and will also possess a sufficient lubricating power for the motor shaft bearings. In order to ensure cleanliness of this oil, a filter can be arranged at a suitable point in the path of the oil, it being further necessary to provide an oil-expansion chamber, which may be arranged in any conventional manner.

It is further permissible, for the cooling of the rotor, to dispose the oil inlets and outlets in such a manner in relation to the axis of rotation that a supplementary pumping effect results by centrifugal action, which permits of making the cooling channels in the rotor smaller or narrower.

The great advantage of the improved motor is, apart from high efficiency, the very small overall size and hermetic tightness against dust, vapours, gases and liquids, so that the motor can be utilised without danger in mines, in petroleum extraction and refinery installations, and so on.

What is claimed and desired to secure by Letters Patent is:

1. An electric motor adapted to be totally immersed in an insulating liquid comprising, in combination: an outer closed body; a shaft mounted for rotation centrally inside said body; a stator secured inside said outer body and defining therewith, on either ends of said stator, a collector chamber and a pump chamber; channels between said stator and said body joining said collector and said pump chambers; a rotor supported on said shaft, coaxial with said stator; said stator and rotor forming a clearance gap therebetween; said stator including a winding constituted by tubes, made of electrically conductive material, electrically interconnected exteriorly of said stator; cooling channels running through and axially of said rotor; a pressure chamber formed within said pump chamber; said stator tubes, rotor cooling channels and clearance gap opening into said pressure chamber and into said collector chamber; pumping means between said pump chamber and pressure chamber for the circulation of the insulating liquid.

2. An electric motor adapted to be totally immersed in an insulating liquid comprising, in combination: an outer closed body having opposed end walls; a rotatable shaft extending through one of said end walls, centrally inside said body; a bearing fixed to the other of said end walls into which one end of said shaft is mounted for rotation; a stator secured inside said outer body and defining therewith, on either ends of said stator, a collector chamber and a pump chamber; channels between said stator and said body joining said collector and said pump chambers; a rotor supported on said shaft, coaxial with said stator; said stator and rotor forming a clearance gap therebetween; said stator including a winding constituted by tubes, made of electrically conductive material, electrically interconnected exteriorly of said stator; cooling channels running through and axially of said rotor; a pressure chamber formed within said pump chamber; said shaft bearing being located in both said pressure and said pump chambers; said stator tubes, rotor cooling channels and clearance gap opening into said pressure chamber and into said collector chamber; the end of said shaft, received in said bearing, being formed with an axial passage; radial passages through said shaft and bearing connected to said axial passage for joining said pump and pressure chambers together whereby said shaft and bearing passages act as a pump to circulate the insulating liquid.

3. An electric motor as claimed in claim 2, wherein said outer body is provided with a cooling jacket.

4. An electric motor as claimed in claim 2, wherein said stator further comprises a stack of annular laminations of magnetic material having, adjacent their inner periphery, a plurality of registering equispaced radially disposed slots adapted to receive tubes; said rotor further comprising a stack of annular laminations of magnetic material mounted on said shaft, each having a plurality of equispaced registering slots at its outer periphery forming said cooling channels; longitudinal members of electrically conducting material extending through and partially filling said cooling channels and being electrically interconnected adjacent their ends.

5. A motor as claimed in claim 4, wherein said rotor laminations are held between end plates of electrically conductive material secured to said shaft and having circumferentially spaced holes registering with said cooling channels.

References Cited in the file of this patent

UNITED STATES PATENTS

| | | |
|---|---|---|
| 2,661,434 | Kilbourne | Dec. 1, 1953 |
| 2,736,825 | Hill | Feb. 28, 1956 |
| 2,975,309 | Seidner | Mar. 14, 1961 |